July 29, 1930. B. S. PENLEY 1,771,734
METHOD OF AND APPARATUS FOR BREAKING AND SEPARATING
Filed March 11, 1925 10 Sheets-Sheet 1

July 29, 1930.  B. S. PENLEY  1,771,734
METHOD OF AND APPARATUS FOR BREAKING AND SEPARATING
Filed March 11, 1925    10 Sheets-Sheet 3

July 29, 1930.    B. S. PENLEY    1,771,734
METHOD OF AND APPARATUS FOR BREAKING AND SEPARATING
Filed March 11, 1925    10 Sheets-Sheet 5

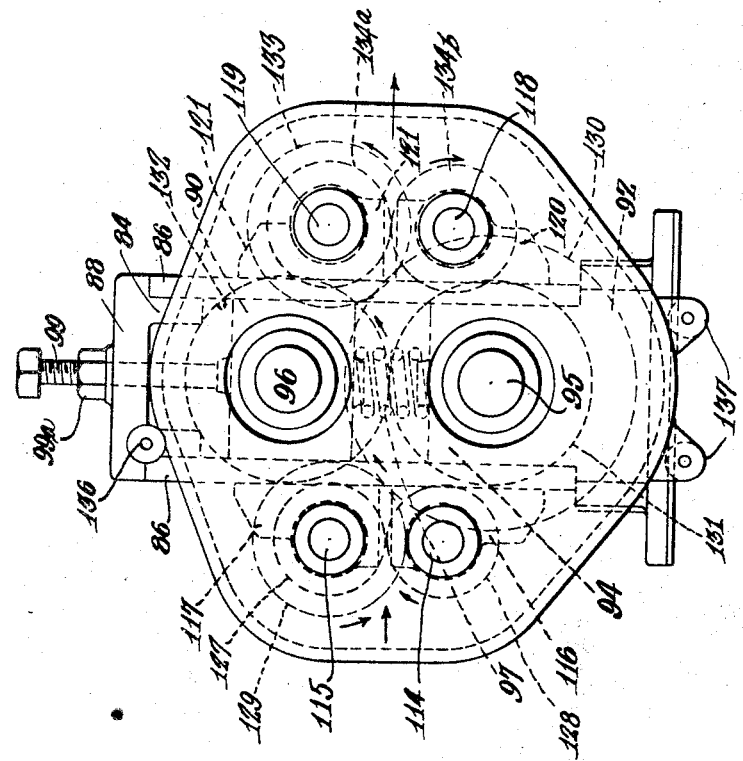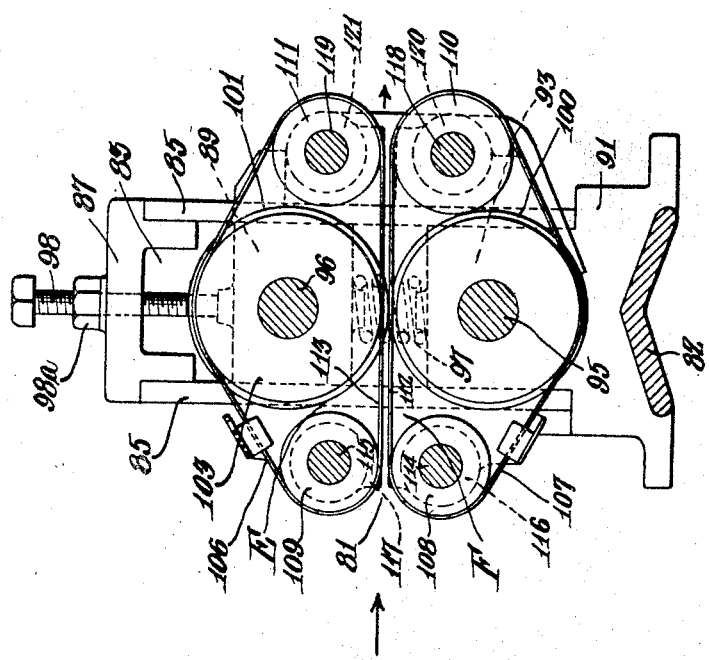

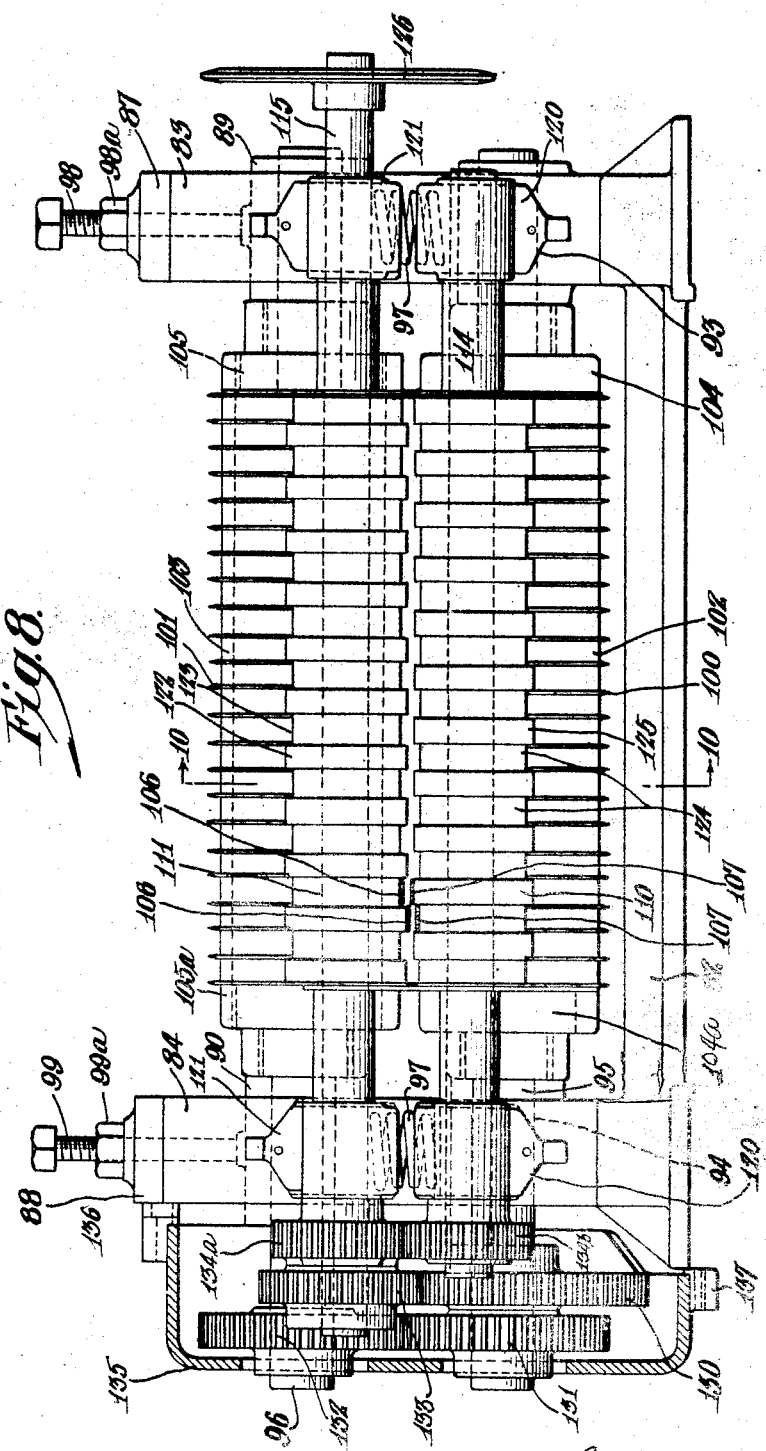

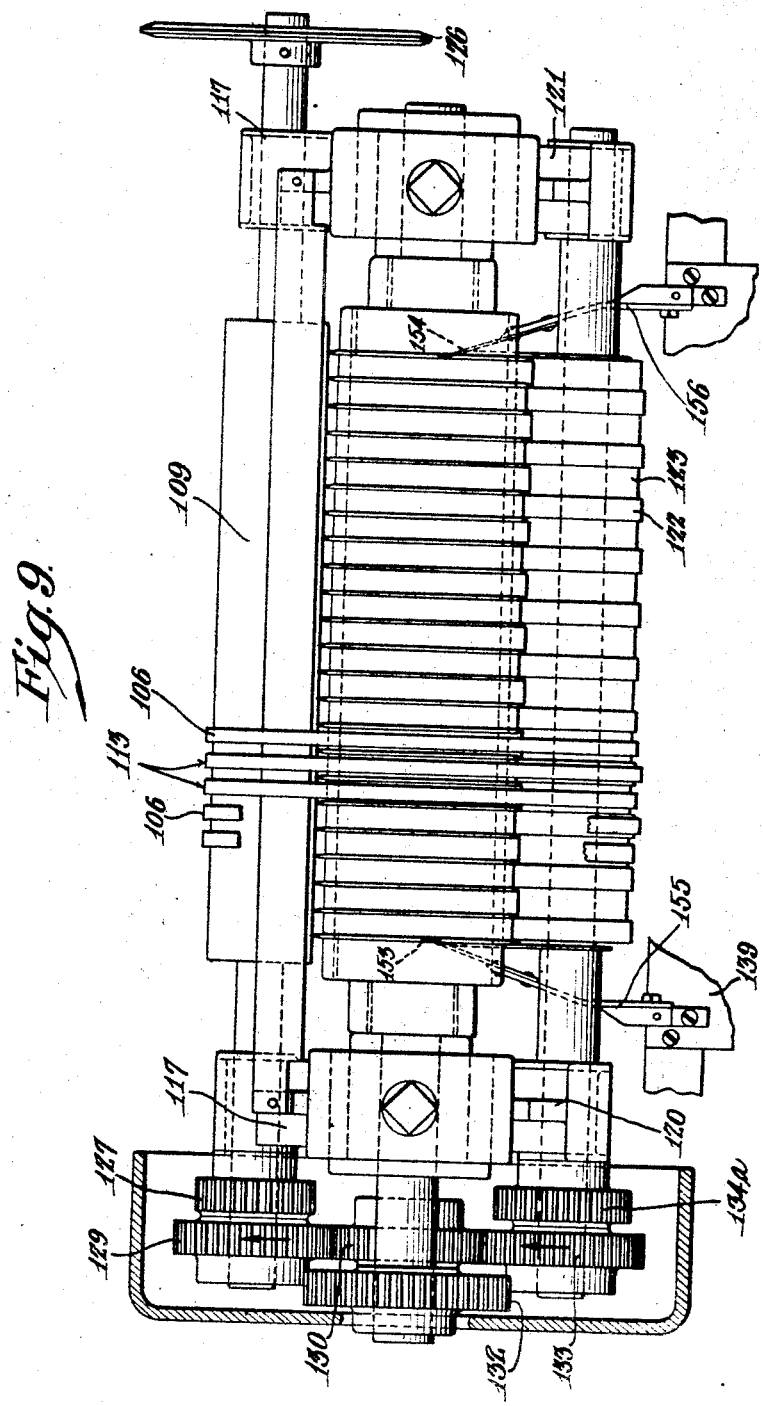

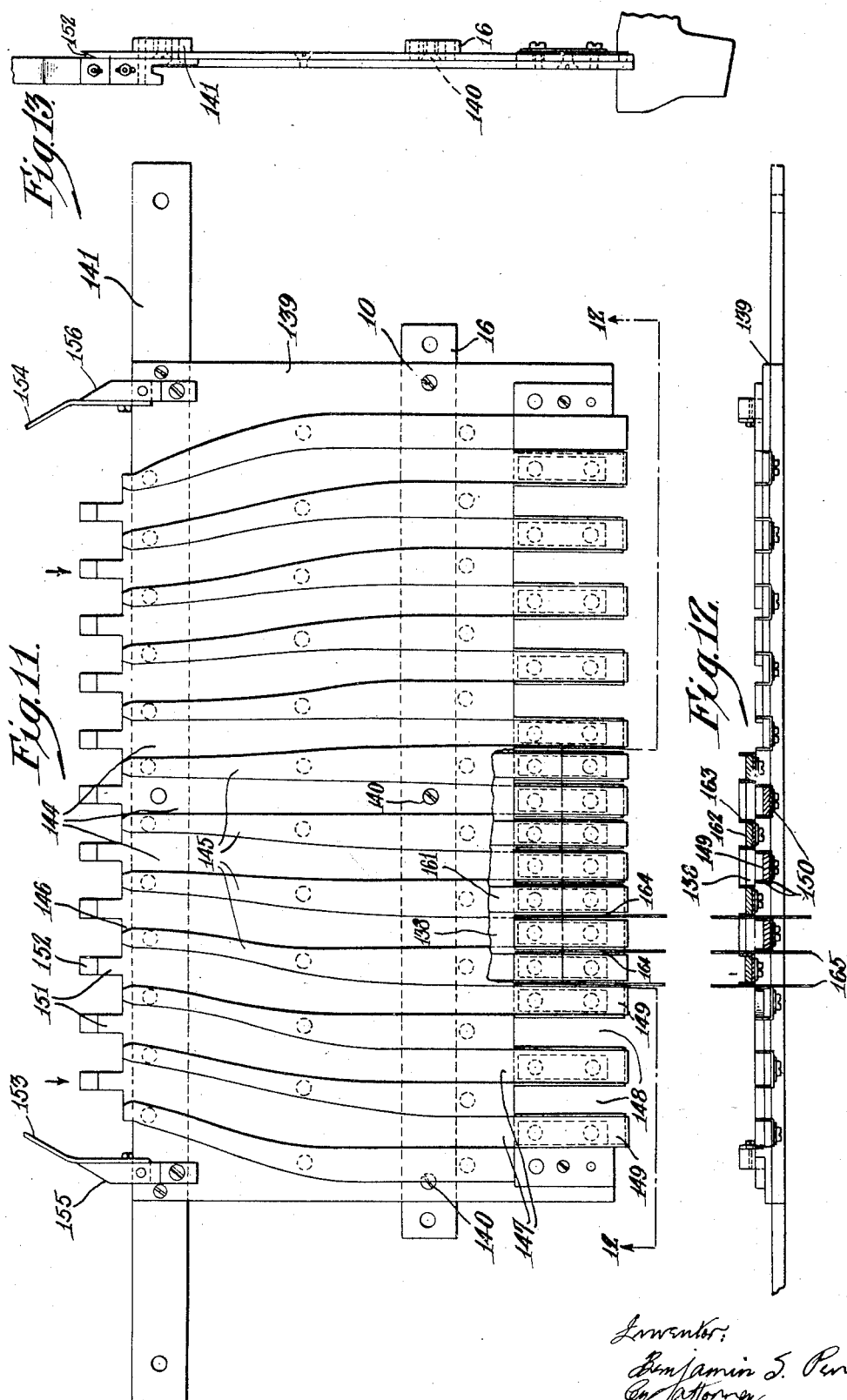

July 29, 1930. B. S. PENLEY 1,771,734
METHOD OF AND APPARATUS FOR BREAKING AND SEPARATING
Filed March 11, 1925  10 Sheets-Sheet 10
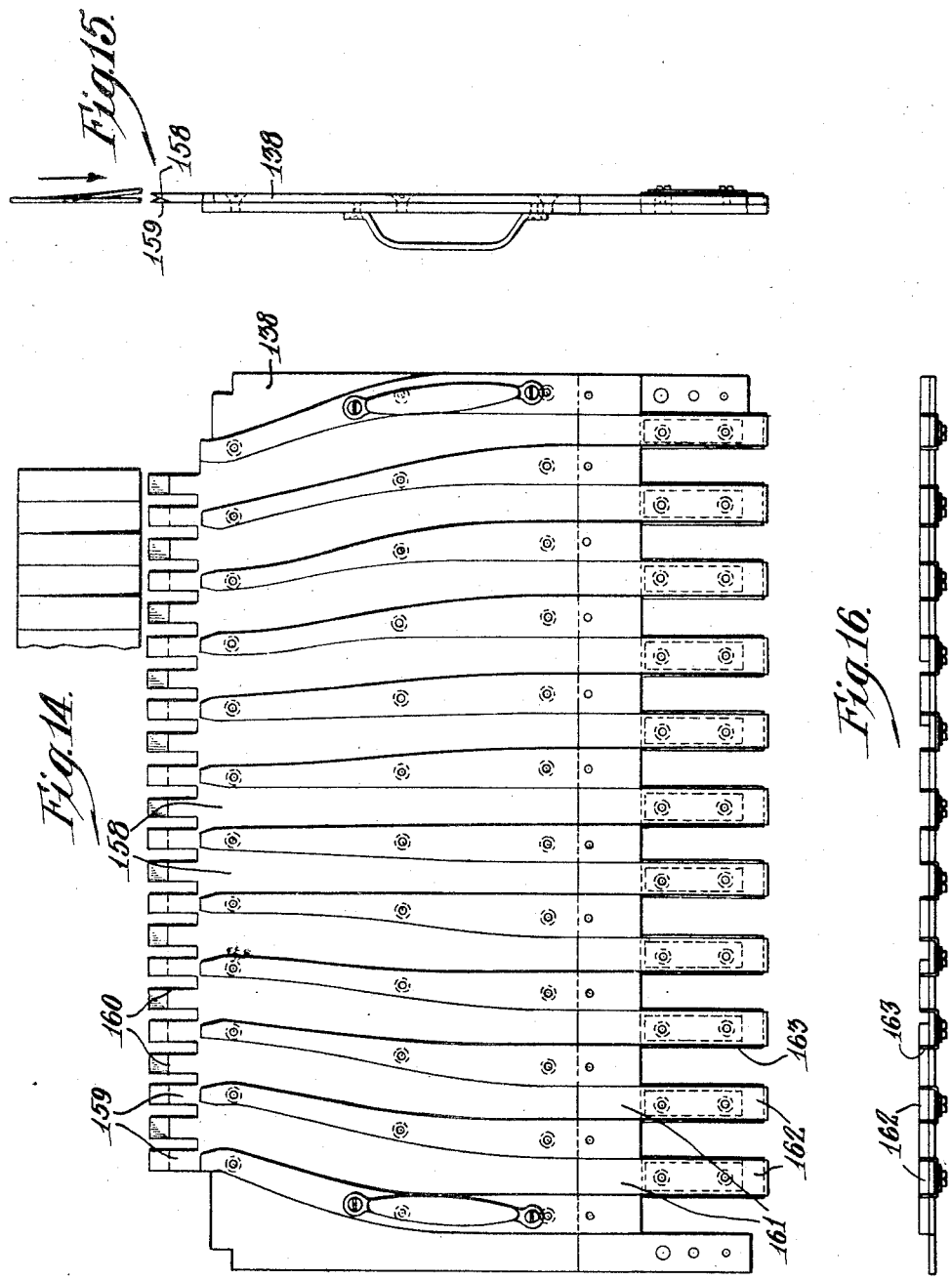

Patented July 29, 1930

1,771,734

UNITED STATES PATENT OFFICE

BENJAMIN S. PENLEY, OF PHILADELPHIA, PENNSYLVANIA

METHOD OF AND APPARATUS FOR BREAKING AND SEPARATING

Application filed March 11, 1925. Serial No. 14,852.

This invention relates broadly to a method of and apparatus for separating, handling, and distributing material, and more particularly includes the steps of and apparatus for dispensing, breaking or separating, and distributing material in sheet form, or articles of a similar nature, and the present invention is more especially employed in the production of commercial sticks of chewing gum and the apparatus is commonly termed a gum breaking machine.

While, for convenience in describing, this invention is illustrated as employed in the manufacture of chewing gum, it will be understood that it may be employed for handling or working other materials and that certain mechanisms thereof may be employed for other purposes and that the invention therefore finds a wide field of utility.

This invention possesses peculiar utility in the manufacture of individual sticks of chewing gum and the like, because of the successful manner in which the method involved and the apparatus for carrying out this method are adapted to the handling of a material such as chewing gum or gum chicle, whose range of temperature within which the same can be conveniently manipulated is extremely narrow inasmuch as such material passes from a state of extremely sticky viscosity almost immediately into a state of brittle solidification upon a slight lowering of the temperature, and vice versa, from a state of brittle solidification to a state of extremely sticky viscosity upon an equally slight increase of the temperature. This characteristic of gum chicle, in chewing gum, demands for proper handling, that the temperature be kept substantially constant at a point between those temperatures producing the undesirable conditions mentioned and that any severing or cutting of the material into sticks be accomplished by fully breaking after scoring rather than relying upon completely cutting through the material for the reason that where the latter is attempted such as where the material is passed through contacting or overlapping knives the cut may be uneven, or a thin film of the material may get between the knives, preventing a clean separation of each section and leaving rough edges. The device of this invention obviates these difficulties by "breaking" the sticks.

This invention is characterized by the provision of an improved method of forming a plurality of sections from a continuous sheet; the provision of an improved method forming a plurality of sections from a continuous sheet, including the steps of scoring the sheet and separating the sections thus formed by moving such sections continuously in different planes; the provision of an improved method of forming sections of material from a single continuous piece, which includes the steps of scoring the piece and causing the piece to move with alternate sections thereof in different planes; the provision of an improved method of producing individual sticks of chewing gum or similar material, which includes substantially continuously dispensing seriatim a plurality of sheets of the material; separating said sheets into strips and depositing said strips in stacks in suitable containers.

This invention is further characterized by the provision of an improved apparatus for producing commercial sticks of chewing gum and for stacking such sticks in suitable containers ready for wrapping; the provision of improved apparatus for producing commercial sticks of chewing gum from sheets of such material, and for stacking such sticks in suitable containers ready for packaging; the provision of improved apparatus for feeding a sheet of material and for dividing said sheet into a plurality of sections; the provision of improved apparatus for feeding a sheet of material and for dividing said sheet into a plurality of sections, and for stacking said sections in suitable containers; the provision of improved apparatus for feeding a plurality of sheets of material seriatim, for dividing said sheets to form groups of sections; and for stacking such groups of sections in suitable containers; the provision of an improved apparatus for feeding a sheet of material, and means for scoring and breaking said sheet to form a plurality of strips; and means for feeding such strips to suitable containers; the provision of improved apparatus which includes means for feeding a plurality of sheets of material, means for dividing said sheets into a plurality of sections, and means for feeding such sections seriatim in groups to suitable containers; the provision of improved apparatus which includes means for feeding a plurality of sheets of material, means for dividing said sheets into a plurality of sections, means for feeding such sections seriatim to containers, and means for advancing said containers synchronously with delivery of such sections thereto.

This invention is still further characterized by the provision of an improved feeding or dispensing mechanism; the provision of an improved ejecting mechanism including aligning means; the provision of an improved ejecting mechanism including tilting mechanism; the provision of an improved ejecting mechanism including improved stopping devices; and the provision of an improved ejecting or dispensing mechanism including improved aligning and tilting mechanisms.

This invention is still further characterized by the provision of an improved severing or separating mechanism, hereinafter called a breaking mechanism; the provision of an improved breaking mechanism including feeding means; the provision of an improved breaking mechanism including improved means for scoring and separating; the provision of an improved breaking mechanism including means for scoring a sheet and for projecting the sections thereof in different planes; the provision of an improved breaking mechanism including rotatory cutters and rectilinearly moveable feeders; the provision of an improved mechanism including cooperating cutting means and feeding means, the latter including members moving in different planes; and the provision of an improved breaking mechanism including rotatory scoring means and linearly movable separating units cooperating with said scoring means, said units being disposed to separate and deliver scored sections of an article in alternately staggered planes.

This invention includes still further an improved conveying and segregating device, hereinafter called a separating device and is characterized by the provision therein of means for conducting a plurality of articles seriatim in spaced groups and for delivering the units of each group in alternately arranged planes for deposit in suitable containers; and the provision, in combination with the separating device, of means for guiding the articles as they are discharged.

This invention still further includes an improved means for conveying a plurality of receptacles; the provision of an improved means for conveying a plurality of articles at variable speeds the provision of an improved conveyor and means for accelerating the movement thereof at predetermined intervals; and the provision of a combined operative structure including improved ejecting means and conveying means operating synchronously therewith and means for accelerating the movement of said conveying means relative to the ejecting mechanism at a predetermined time.

The foregoing and such further objects and advantages as they appear will be pointed out as this description proceeds are attained by the structural embodiment of the invention illustrated in the accompanying drawings, in which:

Figure 7 is an end elevational view of the cutting and breaking mechanism.

Figure 8 is a side elevational view of the device of Figure 7, as viewed from the discharge side thereof;

Figure 9 is a top plan view of the breaking mechanism, with certain parts omitted.

Figure 10 is a vertical sectional view taken on the line 10—10 of Figure 8, looking in the direction indicated by the arrows;

Figure 11 is a fragmentary top plan view of the separating device;

Figure 12 is an edgewise view of a portion of the discharge end of said separating device, some of the parts being shown in section;

Figure 13 is an end elevational view of the separating device;

Figure 14 is a view similar to Figure 11 showing the upper section of the separating device;

Figure 15 is an end elevational view thereof;

Figure 16 is an edgewise view of the top section shown in Figure 14; and

Figure 17 is a horizontal sectional view of the accelerating mechanism shown in Figure 3.

Figure 1:
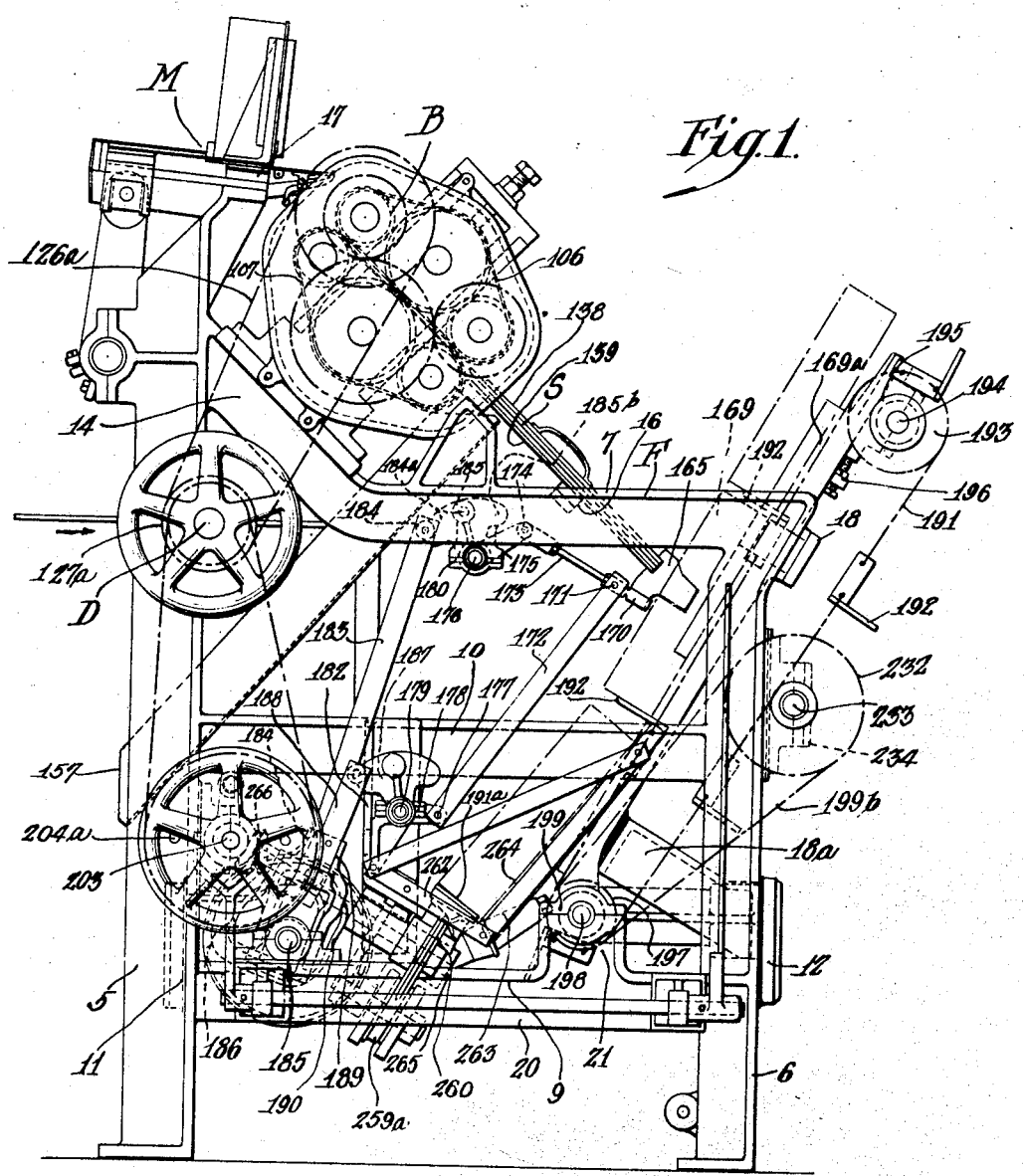
Figure 1 is a side elevational view of the apparatus of this invention.

The method involved in this invention and carried out by the structure illustrated and hereinafter described includes depositing a plurality of sheets of gum, or any other material to be similarly treated, in a suitable magazine, ejecting these sheets edgewise, that is, in a path transversely to their length, from said magazine onto a tray on which each sheet as it is received is alined exactly at right angles to its path of further travel. The sheet is then continued on its path of movement edgewise and is scored at a plurality of points transversely of its longitudinal axis, the scorings being spaced the desired distance to form the standard size stick of chewing gum. As the sheet is scored it is propelled forward and the adjacent sections between the scorings are caused to pass through different planes alternately. The scoring is such as to leave a very thin web of the material connecting adjacent sections of the sheet, and when these sections are caused to pass through adjacent planes which are alternately above and below each other, the thin webs are severed or broken and thus the commercial sticks of gum are produced. This act of severing the sticks has become known as "breaking" in the art, and the improved mechanism for carrying out this step of the method are hereinafter referred to as the "breaking mechanism." After the gum has been broken into sticks of the commercial size, the next step of the method is to cause these sticks to move seriatim in groups to suitable containers in which the sticks of a group are arranged in separate stacks, and when the containers are filled they are removed and are ready for packing by the regular wrapping machines.

It will be seen, therefore, that a continuous method is carried out by which the sheets of gum are not only formed into sticks but are arranged in convenient stacks ready for running through the regular packaging machine.

The method may, of course, be carried out by hand and the method referred to may be carried out by other apparatus than that shown, though from the practical commercial standpoint and the speed with which the sticks are manufactured by the present apparatus, the apparatus disclosed herewith is to be preferred.

The cutting and breaking machine of this invention for carrying out the method described conveniently includes a magazine for receiving a stack or stacks of the sheets of material to be handled, which magazine includes ejecting apparatus and an aligning mechanism; a cutting and breaking mechanism, which includes propelling means; a separating and delivering mechanism; and means for arranging the sticks thus produced in stacks in suitable containers. In connection with the containers and for convenience in stacking the sticks of gum, I provide a mechanism for propelling the containers at predetermined rates of speed, this means being operable to obtain variation in the rate of speed of travel of the container as will hereinafter appear. Coupled with the above mechanisms and where these mechanisms are all embodied in a complete machine, I provide various instrumentalities which operate for the purpose of coordinating the various unit mechanisms described for attainment of the ends desired.

For convenience in supporting the various mechanisms referred to, I provide, (see Figs. 1, 2, 3 and 4,) a frame F, which includes the legs 5—5 and 6—6 connected by the integral top T-beams 7 and 8, integral intermediate T-beams 9 and 10, which extend from the front legs 5—5 to the rear legs 6—6 of said frame, thus forming two sides.

Front and rear plates 11 and 12, respectively, serve to fixedly connect the two sides of the frame near the bottom of the legs 5 and 6, and a transverse plate 13 connects the inclined portions 14 and 15 of the T-beams 7 and 8, respectively, for reinforcing the top portion of the frame and additional transversed reinforcing members being shown at 16, 17 and 18.

Near the lower ends of the legs 5 and 6, on the right hand side of the machine viewed from the aspect of Figure 1, there is provided a connecting T-beam 20 having a pedestal 21, said T-beam 20 serving the purpose of supporting bearings for certain shafts to be hereinafter described.

The magazine mechanism, best shown in Figs. 3, 4, 5 and 6 and generally designated "M", is mounted upon enlarged heads 22 and 23 of the legs 5 and includes a compartment 24 formed by the end plate 25 and the rear panel 27, said panel 27 being vertically adjustable on the brackets 28 and 29 by the provision of retaining bolts 30 and 31. The end plate 25 is secured to the bracket 29 and stop members 32 and 33 are carried by the magazine for preventing the lowermost of the articles contained therein from moving away from the rear panel 27.

It will be observed that the magazine is substantially defined by the panel 27 and the plate 25, the opposite end and the front of the magazine being substantially open to permit introduction of the articles, that is, sheets of gum into the magazine. The articles when inserted are aligned against the plate 25 and against the panel 27, the whole magazine, including the panel 27, being slightly inclined for facilitating the even retention of the contents in a stack. It will be observed from Fig. 3 that the heads of the legs 5 are inclined for this purpose.

The bottom of the magazine is defined by the bottom bar 26, which latter extends across underneath the magazine and is secured by bolts 26ᵃ to the heads 22 and 23.

The ejector includes a relatively thin plate 34 which is adapted to slide upon the plate 35 fixedly secured beneath the magazine to the bottom bar 26. The ejector 34 is secured to a carrier frame 36, which is slidable on guide rods 37—37, said carrier frame being provided with vertical yoke members 38—38 in which cross heads 39—39 are adapted to slide, the yoke members depending from the carrier frame for this purpose.

Motion is imparted to the ejector to reciprocate the same by the provision of rocker arms 40—40, which are pivotally connected at 41—41 to the cross heads 39. The rocker arms are fixedly connected by means of their respective split hubs 42—42 to a transverse rocker shaft 43 mounted in suitable bearings 44—44 near the upper ends of the leg 5.

Rocking or oscillating movement is imparted to the shaft 43 by the provision of a lever 45 fixedly but adjustably secured thereto by the split hub 46 and extending rearwardly to a convenient point above the main drive shaft of the machine indicated as "D". The main drive shaft is mounted in suitable bearings 47—47 on the legs 5.

The main drive shaft receives its motion from a sprocket 46ª (Fig. 2), chain 46ᵇ, and a sprocket 46ᶜ, mounted on shaft extending from a reduction gear housing "H" mounted upon the bracket 50ª.

Motion is imparted to the arm 45 by the provision of an eccentric 48 mounted on the shaft "D" and an eccentric strap 49 having an arm 50 extending therefrom, which latter connects pivotally at 51 to the outer end of the lever 45.

A housing including a top plate 52 and a flange 53 serves to enclose the carrier frame 36 so that an operator will not be injured by coming in contact therewith.

The ejector 34 is preferably of a thickness slightly less than that of a standard stick or sheet of chewing gum, or of the article which is to be ejected, and the rear panel 27 is preferably supported at a distance from the plate 35 slightly greater than the thickness of the article to be ejected, so that only one article may be ejected at a time.

After the ejector has forced one sheet out of the magazine, I find it expedient to provide a tray for receiving such sheet for two purposes, namely, for realigning the article to lie in a plane exactly at right angles to its path of travel so that when it is grasped by the breaking mechanism, generally designated "B", such sheet will pass through this mechanism evenly and in a straight line.

The tray for the purpose explained is indicated at 54 and is in the up position in substantially the same plane as that of the plate 35, brackets 55 being secured to the bar 26 and serving as means for pivotally mounting the tray 54 as at 56.

For realigning a sheet on the tray 54 when the same slides onto said tray, I provide a pair of fingers 57 pivoted at 58 underneath the tray and extending above the outer edge of the tray as at 59 to engage the edge of a sheet deposited on the tray. The lower ends of the fingers 57 are provided with rollers 60, which are adapted to come in contact with the heads 61—61 of the screws 62—62 adjustable in brackets 63—63 fixedly mounted on the underside of the bar 26. Such contact of the fingers 57 serves to withdraw the projecting ends 59 from the position shown in Fig. 6 and permits the article to gravitate from said tray to the breaking mechanism when said tray is depressed.

The mechanism for depressing the tray 54 preferably includes a lever 64 adjustably secured to a shaft 65, the outer end of the lever 64 being bifurcated to form a slot 66 which receives a pin 67A carried by bracket 67 fixedly secured to the underside of the tray 54. It will be observed that oscillating movement of the shaft 65 will in turn impart such movement to the lever 64 and through the connection with the tray 54 cause the same to be depressed or elevated, as the case may be.

Oscillating movement in proper time is imparted to the shaft 65 by the provision of a rocker arm 68 secured fixedly to said shaft and pivotally connected at 69 to an adjustable link 70 which is pivotally connected at 71 to a bracket 72 adjustable on the arm 73 of a bell-crank lever 74 pivoted at 75 in a bracket on the underside of the transverse plate 13. The other arm 76 of said bell-crank lever carries a roller 77 (see Fig. 4) which is adapted to run in the groove 78 (see Fig. 3) of a cam wheel 79 fixedly secured to eccentric by means of pins 80 but is free on shaft "D."

Figure 3:
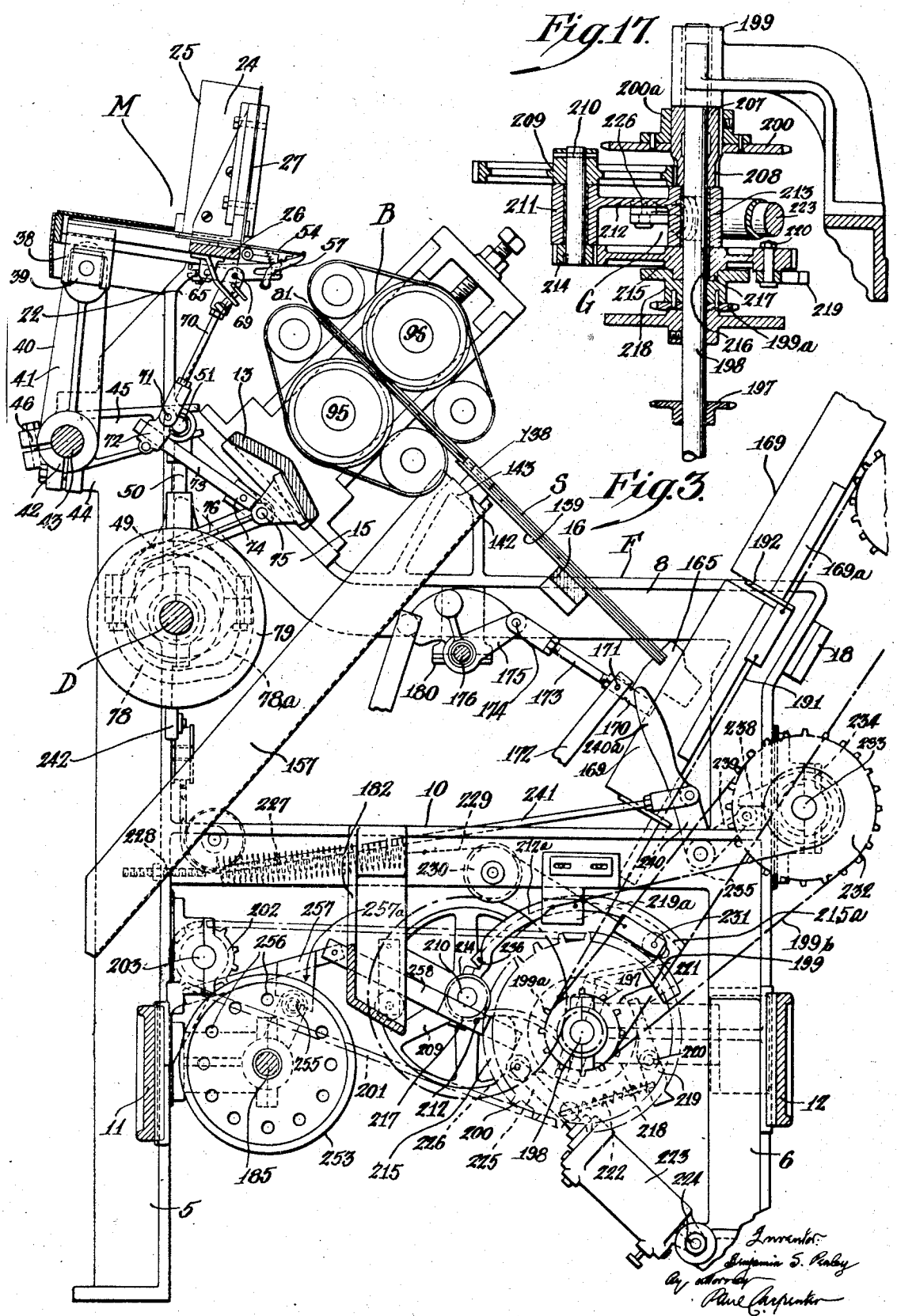
Figure 3 is a vertical sectional view taken on the lines 3—3 of Figure 2, looking in the direction indicated by the arrows.

It will be understood, of course, that the timing of the eccentric 48 and the cam wheel 79 is such that with the ejector in the position shown in Fig. 3 the said ejector will be caused to move forward delivering one of the articles to the tray 54 whereupon at the proper interval the high point 78ª of the groove 78 will elevate the tray to receive the ejected article, and as motion continues the arm 76 will be moved in the opposite direction to depress the tray, release the fingers 57 and thus permit the article to pass by gravity from the tray into the entry end 81 of the breaking mechanism "B."

Referring now to the scoring and breaking mechanism, best illustrated in Figs. 1, 3 and 7 to 10 inclusive, this device generally comprises scoring or cutting rolls, and feeding and breaking conveyors, the mechanism being enclosed in a suitable housing and mounted on the inclined portions 14 and 15 of the T-beams 7 and 8.

As previously set forth, the breaking mechanism is designated "B" and is located, as shown in Figs. 1 and 3, at an inclination to the horizontal to the rear of and adjacent to the tray 54, so that when said tray is tilted downwardly it is in substantially the same plane as that of the conveyor members of the breaking mechanism.

Referring now to Figs. 7 to 10, inclusive, the breaking mechanism includes a base portion 82 having integral standards 83 and 84 at the ends thereof, which standards serve to support the bearings for the various revoluble elements of the device.

The standards 83 and 84 include parallel spaced bars 85—85 and 86—86, having suitable fixed connection to the base 82 and being fixedly connected to heads 87 and 88, respectively, the bars 85 and 86 affording spaced guides between which the bearing boxes or blocks 89 and 90 are received and in which these bearing blocks are vertically adjustable.

The bottom portions 91 and 92 of the standards afford bearings 93 and 94 for supporting a revoluble shaft 95, and the blocks 89 and 90 afford bearings for revoluble shaft 96, the shafts 95 and 96 being substantially parallel and adjustable with respect to the distance between their axes by adjustment of the bearing blocks 89 and 90, suitable helical expansion springs 97—97 being placed between each of the blocks 89 and 90 and a corresponding base portion 92 and 93. Set screws 98 and 99 are provided in the heads 87 and 88 for depressing the bearing blocks 89 and 90, and lock nuts 98$^a$ and 99$^a$ are placed on said screws for maintaining them in a set position.

On the shafts 95 and 96 there are fixedly mounted for rotation therewith a plurality of circular knives 100 and 101, said knives being spaced apart a desired distance by the provision of circular spacing discs 102 and 103, respectively. The distance between each of the knives corresponds to the width of a stick of the material, e. g., chewing gum, and these knives are retained on their respective shafts by the provision of clamping collars 104, 104$^a$, 105 and 105$^a$.

The roll mounted on the shaft 96 and including the multiple knives 101 is adjustable toward the multiple knives 100 by turning the set screws 98 and 99, the preferred adjustment being to bring the peripheral edges of the knives, which are in transverse alignment, into a position in which there is a relatively small space between said edges, so that an article to be scored when passed between the knives will be cut to a depth which leaves a thin web connecting adjacent sections.

The knives described form the scoring mechanism and the breaking mechanism includes a pair of multiple conveyor units generally designated "E" and "F" and including each a plurality of spaced flexible belts 106—106 and 107—107.

The belts 106 and 107 are, respectively, trained over driving drums 108 and 109 and over the circular knives, that is, over the discs between adjacent knives as shown in Fig. 10, and then over separating rollers 110 and 111, the intermediate stretches 112 and 113 of opposed belts being substantially parallel, and spaced apart approximately the thickness of the article to be conveyed and passing between the multiple knives, that is, through the spaces between adjacent knives.

The drums 108 and 109 are fixedly mounted for rotation with revoluble shafts 114 and 115 which are mounted in suitable bearings 116—116 and 117—117 on the standards 83 and 84, and the separator rolls 110 and 111 are mounted freely on shafts 118 and 119 mounted in suitable bearings 120—120 and 121—121. The driving drums 108 and 109 and the separator rolls 110 and 111 are so placed with respect to the knives that the belts pass through the space between the knives substantially tangentially to the spacing discs and substantially normal to the vertical axis of the device.

From an inspection of Figs. 8, 9 and 10, the construction of the separator rolls may best be seen. It will be noted that the upper roll 111 includes a plurality of cylindrical surfaces 122 and 123, these surfaces being alternately arranged and of different diameters so that the belts 113 passing over said surfaces will be in different planes and correspondingly the lower roll 110 is provided with cylindrical surfaces 124 and 125, the surfaces 125 being in alignment with the surfaces 123, and the surfaces 124 being in alignment with the surfaces 122, so that alternately the belts passing over said rolls, and the intermediate stretches of said belts, will be in different planes.

From an inspection of Fig. 8 it will be seen that an alternate arrangement of the belts is such that as a section of the article formed by the knives passes out between the separator rolls it will be deflected with respect to an adjacent section, thus breaking the thin web connecting these sections and causing the sections to issue from the device in different planes.

Motion is imparted to all of the shafts included in the breaking mechanism by extending the shaft 115 and mounting a sprocket wheel 126 thereon, gears 127 and 128 being mounted on the adjacent opposite ends of the shafts 114 and 115 for driving said shafts simultaneously at the same speed in opposite directions. Motion is imparted from the shaft 115 to the shaft 95 by the provision of a gear 129 meshing with a gear 130 on the shaft 95, and the shaft 95 drives the shaft 96 by means of intermeshing gears 131 and 132, the gear 130 meshing with a pinion 133 mounted on the shaft 119 on which shaft is also mounted gear 134A which in turn meshes with the pinion 134B mounted on the shaft 118 (see Figs. 9 and 10).

The direction of movement of the pinions 127, 129, 130 and 133 is indicated by the arrows shown in Figs. 7 and 9.

A suitable housing 135 serves to encompass the gearing, this housing being provided with lugs 136 and 137 whereby it may be secured fixedly to the standard 84.

Figure 2:
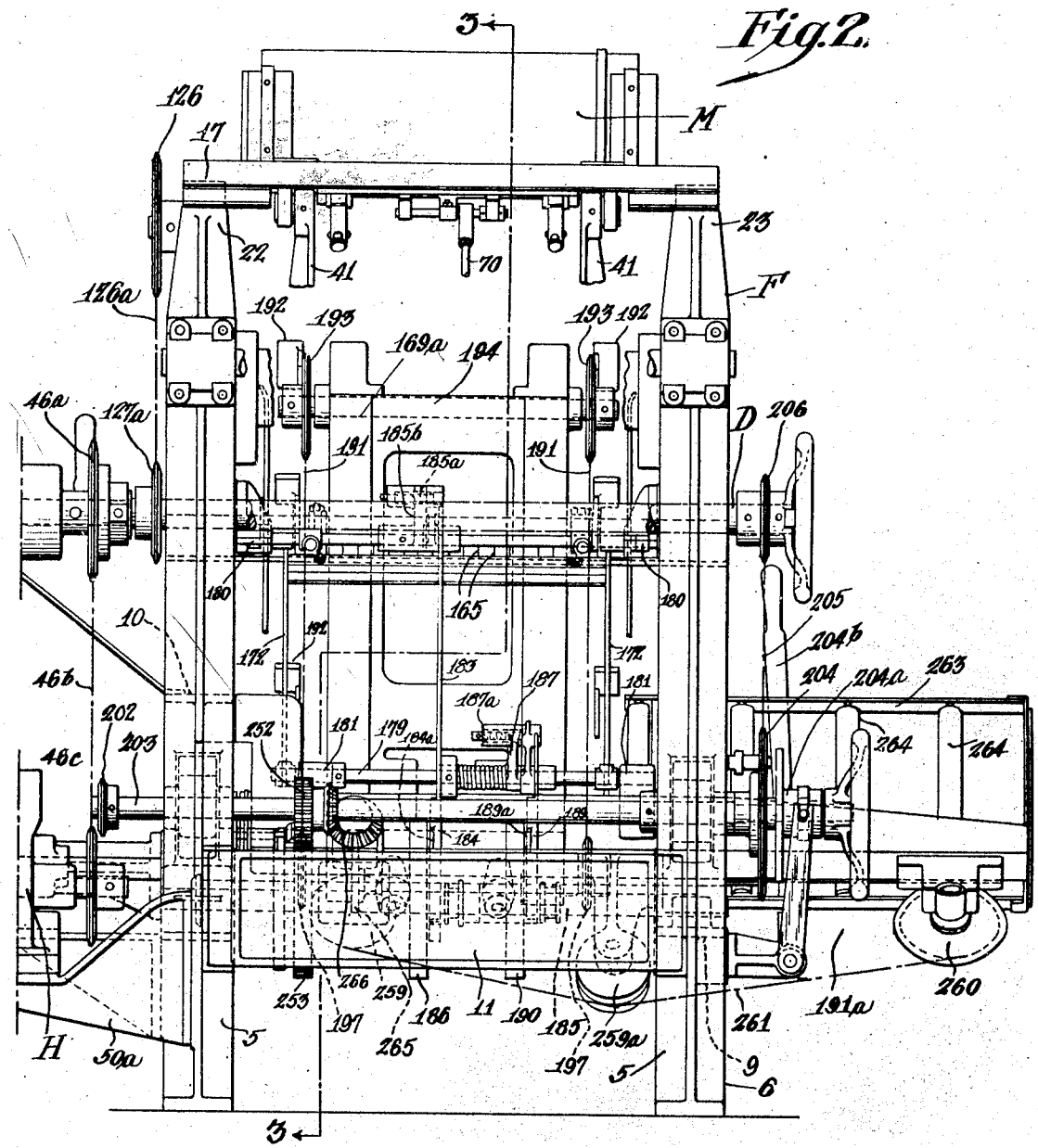
Figure 2 is a front elevational view of the same.

The sprocket 126 is continuously driven from the main drive shaft "D" by means of a chain 126ª trained over said sprocket and over a sprocket 127ª mounted on the shaft "D", as best shown in Figs. 1 and 2.

After the sticks of gum, or other material, thus formed issue from the breaking mechanism they are conveyed in groups, conveniently by gravity to suitable containers in which they are deposited in multiple stacks, or each separate stack may be deposited in a separate container. It is necessary in delivering the sticks of gum that they be slightly separated, at least separated a greater distance than they normally would be upon issuing from the breaking mechanism, and with this end in view I have provided the channel members illustrated in Figs. 1, 3 and 11 to 16, inclusive, this separating means being generally designated "S" and conveniently positioned, as shown in Figs. 1 and 3, to receive the sticks as they issue from the breaking mechanism, the separating channel device being disposed in a plane substantially coincident with the planes of the belts 112 and 113.

As the sticks of gum issue from the breaking mechanism in groups in which the units of each group alternately lie in upper and lower planes, it is necessary that the channel members which cause the individual sticks of the group to diverge, be arranged in a pair in upper and lower planes.

The channel members include an upper plate 138 which carries the upper run, or group of channels, and the lower plate 139, which carries the lower run or group of channels and upon which said upper plate is superposed.

The lower plate 139 is fixedly secured, by the provision of bolts or rivets 140—140 to the transverse reinforcing bar 16, and said plate 139 is similarly secured to the supporting bar 141 which latter is secured at 142 to inclined pedestals 143 provided on the horizontal T-beams 7 and 8.

The lower plate 139 is provided with a plurality of channels 144 formed by riveting or otherwise fixedly securing the properly shaped bars 145 to said plate, it being observed from an inspection of Fig. 11 that the bars are of such a shape that the channel at the medial portion of the plate is substantially straight though of slightly greater width at the entry than at the delivery end, the entry end of each groove being disposed opposite to and in alignment with the lower stretches of the series of belts of the breaking mechanism and of slightly greater width than the width of a stick of gum so that the entrance of the stick into its proper channel will not be hindered. The bars 145, in this connection, near their receiving ends, are beveled as indicated at 146, and from the medial portion of the plate in opposite directions toward the outer edges the bars 145 are divergently arranged and curved so that the discharge ends 147 of the grooves or channels 144 are separated a greater distance than at the receiving end, thus affording spacing 148 between each of the bottom channels for accommodating an alignment or positioning of the upper channel, (to presently be described), between said lower channels.

The lower plate, as shown in Fig. 11, at its discharge end is provided with a plurality of tongues 149 in alignment with the discharge end 147 of the channels, and said channels are continued on said tongues by the provision of sheet metal trough members 150 which have their side walls extending above the tongue 149. Thus it will be seen that the discharge ends of the lower channels are spaced to permit of the upper channels having their discharge ends in alignment with and alternately disposed between such spaces, though above the same, as will appear.

In order to insure the stick of gum entering each of the lower channel members accurately, the receiving end of each channel member is provided with an outwardly projecting tongue 151 which lies immediately adjacent to the lower belt of the corresponding series, said tongue being provided with an upwardly inclined beveled surface 152 tending to guide the stick of gum into the corresponding channel.

Reverting to the breaking mechanism, it will be apparent that in order to insure a smooth cut on the endmost sticks cut from a sheet, the sheet should be slightly longer than the distance between the endmost knives of the breaking mechanism, and in order to remove this overhang of material, there are provided the scraping knives 153 and 154 secured by the provision of brackets 155 and 156 to the ends of the bottom plate 139, said knives projecting inwardly at an angle to the path of travel of the material and terminating substantially in alignment with the axes of the shafts 95 and 96, and cooperating with the endmost knives to remove the material which overhangs. This material is deposited in inclined troughs 157 and may be conveyed to a suitable point outside of the machine.

Referring again to the separating plates, the upper plate shown in Fig. 14 is substantially a duplication of the lower plate, this upper plate being placed upon the lower plate and secured fixedly thereto in a suitable manner so that the channels 158 of the upper plate will be alternately arranged with respect to the channels 144 of the lower plate, the receiving end of the plate 138 being provided with series of tongues 159 and 160, the tongues 160 having beveled surfaces for aiding the entrance of a stick of gum into the respective upper channels, and the tongues 159 being provided with beveled surfaces cooperating with the beveled surfaces 152 of the tongues 151.

The discharge ends 161 of the channels 158 are alternately disposed with respect to the lower channels and the plate 138 is provided with projecting tongues 162 which carry sheet metal trough members 163 similar in construction to the trough members 150 but disposed in a higher plane than said trough members 150 and alternately relative thereto.

This arrangement of the trough members on the upper and lower plates affords spaces 164—164 between each of the trough members 150 and 163 so that the sticks of gum as they issue from the separating device are spaced apart a convenient distance for stacking and so that one stack will not overlap an adjacent stack. The spaces 164 also permit of the entrance thereinto of the guide blades 165, the function of the latter being to lie between each stack in the container or containers and maintain their separation, and further to guide the sticks of gum as they issue from the separating device. The relationship of the discharge ends of the channels on the upper and lower plates, and of said guiding blades is clearly illustrated in Fig. 12.

It will be seen from an inspection of Fig. 1, wherein the containers or trays 169 are shown which are adapted to receive the stacks of gum, that the guides 165 project into said containers, and as each container is filled and passes on down means are conveniently provided for automatically withdrawing the guides therefrom. It is suggested, that such a means may be eliminated by making slots in the ends of the containers to accommodate the guides as the containers are shifted, but to facilitate the automatic operation of the machine the guides are in the present instance illustrated as automatically movable into and out of operative position.

For operating the guides 165 a carrier frame 170 is provided on which all of said guides are fixedly mounted, this frame taking the form of a bar which is pivoted at 171 on a supporting link 172, an adjustable arm 173 being fixed to the bar 170 and extending therefrom toward the front of the machine as will best be seen in Figs. 1 and 3. The link 172, as will hereinafter appear, performs the function of depressing the guides clear of the separating device and the lever 173 functions to withdraw the guides from the containers.

As will be seen from an inspection of Fig. 2 the links 172 and members 173 are arranged in pairs in order to make the mechanism more rigid, the levers 173 being pivotally connected at 174 to the arms 175 which latter are fixed upon a transverse shaft 176. Similarly, the link 172 is connected pivotally at 177 to an arm 178 fixedly connected to the oscillating shaft 179. The shafts 176 and 179 are mounted in suitable bearings 180—180 and 181—181, the bearings 180 being secured to the T-beams 7 and 8 and the bearings 181 being secured to a casting frame 182 which is in turn supported by the T-beams 9 and 10.

The shaft 176 is oscillated by means of a link 183 pivotally connected at 184 to a lever member 185 rotatable on said shaft 176, the link 183 being fixedly connected to a yoke 184 which embraces the shaft 185 and is adapted to be raised and lowered, that is, reciprocated transversely of said shaft by the provision of a cam 186 secured to said shaft 185.

Motion is imparted to the link 172 by shaft 179 by the provision of a lever 187 fixed to said shaft 179, a link 188 pivotally connected to said lever 187, yoke 189 fixed to said link 188 and embracing said shaft and said yoke being reciprocated transversely of the shaft by the provision of a cam 190 mounted on said shaft 185.

Each of the yokes 184 and 189 are provided with pins 184$^a$ and 189$^a$ which engage in grooves in the cams 186 and 190, respectively.

The connection of the lever 185 to the shaft 176 is effected (as shown in Figures 1, 2 and 3), by the provision of sockets 184$^a$ in the lever 185 and a sliding pin 185$^a$ carried by a lever 185$^b$ which is pinned to said shaft, thus serving as a safety device rendering the mechanism inoperative should it become jammed.

The sticks of gum formed by the breaking mechanism and conducted by separating device "S" are discharged into containers 169—169, which are carried downwardly past the discharge end of the separating device "S" by the provision of suitable guides 169$^a$ and an endless chain conveyor designated 191. This conveyor 191 is provided with brackets 192—192 for supporting the containers 169 as they slide along the guides 169$^a$.

The conveyor 191 is trained, at its upper end, over sprocket wheels 193 on a shaft 194 mounted in bearings 195 carried by the guides 169$^a$, said bearings 195 being vertically adjustable in the guides 169$^a$ by means of bolts 196.

The guides 169$^a$ are preferably in the form of a platen casting which is supported by the transverse beam 18 near its upper end, and near its lower end by the provision of the brackets 18$^a$ secured to the transverse panel 12.

The lower end of the endless conveyor is trained over sprockets 197 mounted on a transverse shaft 198 supported in bearings 199 in the pedestals 21.

Motion is imparted to the conveyor substantially synchronously with the delivery of the sticks to the containers 169 by the provision of the automatic variable speed gearing generally designated "G" and best illustrated in Figs. 3 and 17.

This gearing "G" includes a sprocket wheel 200 which is driven by means of a chain 201 from a sprocket wheel 202 fixedly mounted on the rotatable shaft 203, said shaft being driven from the drive shaft "D" by the provision of the sprocket 204 freely rotatable on said shaft 203, the chain 205, and a sprocket wheel 206 rotatable with the main drive shaft "D". For convenience in stacking sticks of gum slightly thicker than the standard size, the trays are caused to move faster than necessary to stack the standard size sticks, and therefore the pin clutch 204$^a$ is provided, operable by the lever 204$^b$, for stopping the shaft 203 for a moment to permit the ejector to catch up. This is necessary only where the ratio of ejector speed and rate of movement of the container is as stated to permit stacking thicker sticks.

The sprocket wheel 200 is thus continuously driven, (except as noted,) and is provided with a hub portion 200$^a$ which is keyed for rotation with a sleeve 207, freely rotatable on the shaft 198. The inner end of the sleeve 207 is formed to provide a pinion 208 which meshes with a spur gear 209 mounted upon and fixedly secured to a shaft 210. The shaft 210, in the nature of a counter-shaft, is mounted in a bearing 211 in the outer end of an oscillatable arm 212, the hub portion 213 of said arm 112 being mounted freely rotatably on the shaft 198.

The end of shaft 210 opposite to the spur gear 209 carries a pinion 214 meshing with a spur gear 215, which is keyed as at 216 to the shaft 198.

The gear 215 is provided with an extending hub 217 on which a ratchet wheel 218 is mounted, said ratchet wheel 218 being freely rotatable relatively to the gear 215 and to said shaft 198. The ratchet wheel 218 carries a sprocket wheel 199$^a$ and motion is imparted from the spur gear to the sprocket wheel at predetermined intervals by the provision of a pawl 219 pivoted at 220 on said spur gear 215, one end of said pawl being adapted to engage a projection or detent 221 carried by the ratchet wheel 218, a helical spring 222 tending to maintain said pawl against the circular edge of the ratchet wheel and hence to present the end of said pawl into a position whereby it may readily engage said projection.

The oscillatable arm 212 is substantially semi-circular in configuration, as will be seen from an inspection of Fig. 3, said arm being provided with a curved portion 212$^a$ lying in the plane of an arc described from the shaft 198 as a center. The arm 212 is caused to oscillate through a predetermined arc as will hereinafter appear and in order to obviate a too sudden movement of said arm and a resultant jarring of the mechanism, a dash-pot 223 is provided hinged at 224 to one of the legs 6 and having its piston rod 225 pivotally connected at 226 to a lug formed on the oscillatable arm 212.

A helical spring 227 is adjustably anchored by means of the screw 228 to one of the legs 5 and the other end of said spring is connected by a chain 229 trained over an idler roller 230 to the rearward end 231 of the arcuate portion 215$^a$, thus tending to pull the arm 215 to the left as viewed from the aspect of Fig. 3.

The sprocket 199A is connected by a chain 199$^b$ to a sprocket wheel 232 which is fixedly mounted and rotatable with the shaft 233, said shaft being mounted in a suitable bearing 234 near the upper end of the standard or leg 6.

One end of the shaft 233 carries a drum 234 over which a chain or cable 235 is wound, the free end of said chain 235 being connected at 236 to the arcuate portion 215$^a$ of the lever arm 212, so that as the chain 235 is wound upon the drum 234 the arm 212 is swung through the arc of a circle to the right, as viewed from the aspect of Fig. 3, against the tension of the spring 227.

The swinging motion of the arm 212 around the shaft 198 causes the pinion 214 and gear 209 to function in the nature of a planetary gearing in that these elements move around the peripheries of the gear 215 and pinion 208.

It will be seen that the shaft 198 is driven at a predetermined rate of speed, that is, at a speed sufficient to drive the conveyor chain at a rate which will cause the containers 169 to pass downwardly just fast enough to accommodate each successive stick or groups of sticks as they enter the container, this movement of the containers being accelerated at the proper moment, as will appear.

As the chain 235 is wound upon the drum 234 the arm 212 is raised due to the drive of the sprocket wheel 232 by the chain 199$^b$, this driving of the sprocket 199$^a$ being accomplished by the pawl 219 on the spur gear 215.

As soon as the pawl 219 engages the adjustable abutment 219$^a$, the pawl is released, which permits the spring 227 to pull the arm 212 back to the left, as viewed in Fig. 3, and the resultant planetary movement of the pinion 214 over the spur gear 215 accelerates the motion of the latter and thus speeds up the conveyor between the containers, that is, when the rear end of one container reaches the guides and the forward end of the succeeding container arrives this acceleration takes place.

Simultaneously with the acceleration of the containers, the guides 165 are withdrawn and this is accomplished by the cams 186 and 190 carried by the shaft 185, the cam 190 actuating the lever 172 to first depress the guides and the cam 186 then functioning to move the guides out of the containers.

Figure 4:
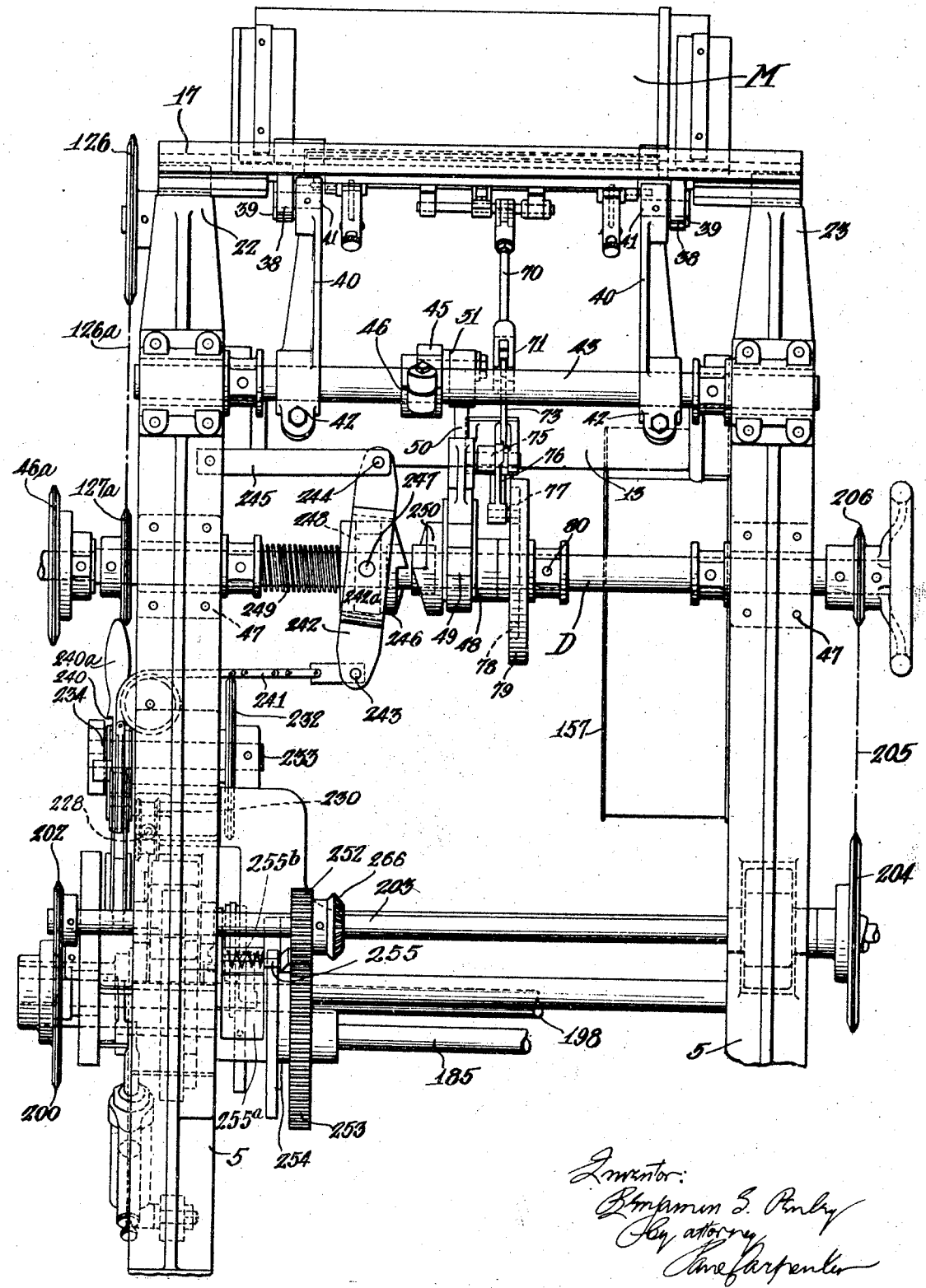
Figure 4 is an enlarged fragmentary front elevational view of the device.
Figure 5:
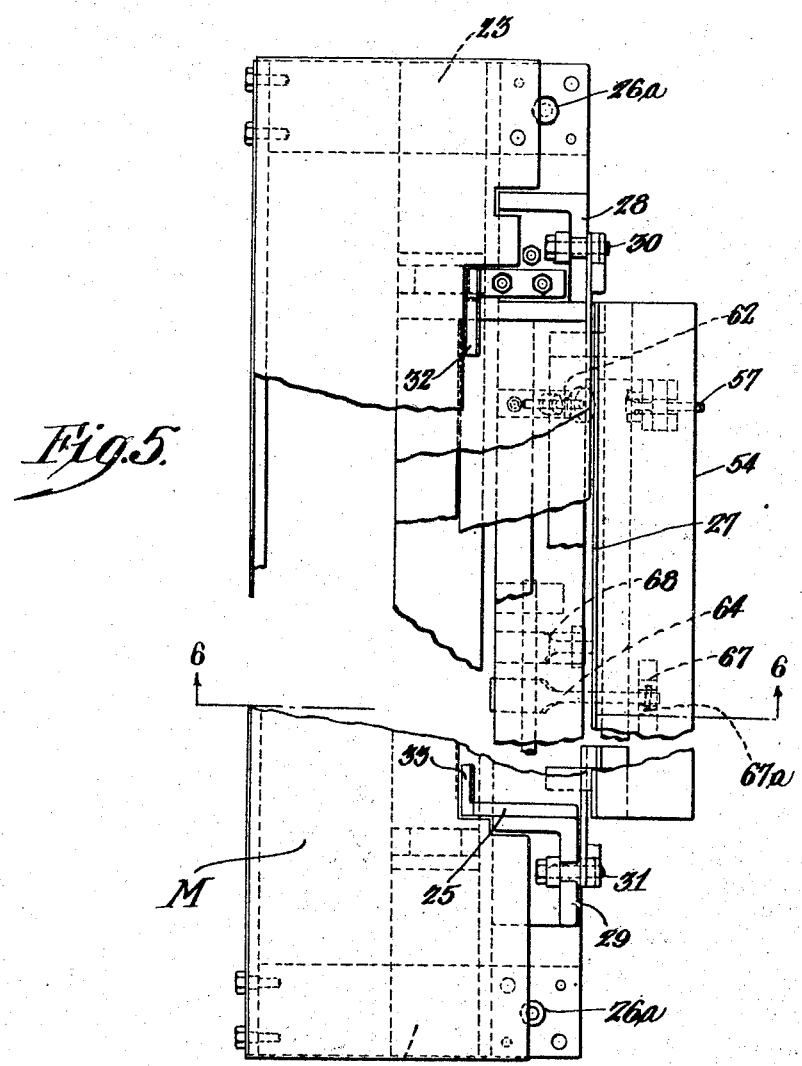
Figure 5 is a top plan view of the ejecting mechanism.
Figure 6:
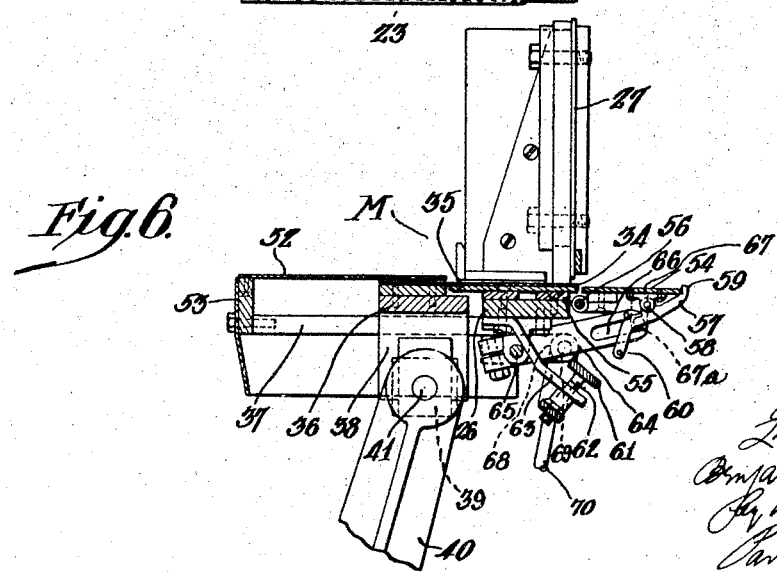
Figure 6 is a transverse sectional view taken on the line 6—6 of Figure 5, looking in the direction indicated by the arrows.

Simultaneously with these two operations the ejector is stopped, the mechanism for accomplishing this being best shown in Figs. 3 and 4. On the shaft 233 there is provided a radially projecting lug 238, which is adapted to engage one arm 239 of a bell crank lever 240, said lever being pivoted on the T-beam 10. The lever 240 is connected by a chain 241 to a clutch which includes the actuating arm 242 connected at 243 to said chain 241; said actuating arm 242 being pivoted at 244 on a bracket 245. The actuating arm 242 includes a ring portion 242$^a$, which encompasses a clutch member 246 and is pivotally connected to blocks 248 which engage in a circumferential groove in the clutch member 246, said clutch member being keyed to the shaft "D". When the chain 241 is pulled it slides the clutch member 246 on the shaft against the tension of a helical spring 249 away from the complemental clutch member 250 which drives the eccentric 48, thus stopping the ejecting mechanism. This stoppage of the ejector may be accomplished manually by the provision of a handle 240$^a$ on the lever 240.

When the arm 212 swings downwardly, that is, to the left as viewed in Figure 3, by the action of spring 227, the chain 235 is unwound from the drum 234 thus moving the projection 238 away from arm 239 and permitting the spring 249 to engage clutch members 246 and 250, and start the ejector.

Reverting to the mechanism for controlling the guides 165, it will be understood that the shaft 185 operates periodically to move the cams 186 and 190, this intermittent rotation of the shaft 185 being produced by the provision of a pinion 252 fixed upon the shaft 203 for rotation therewith, said pinion meshing with and driving the gear 253, which latter is freely rotatably mounted upon the shaft 185.

The gear 253 is periodically connected to the shaft 185 to drive the same one revolution, by the provision of a clutch 254, including a spring actuated pin member 255 which engages one of a plurality of openings 256 in the gear 253. The pin 255 is actuated by the series of levers 257, 258, shown in Figure 3.

The pin member 255 is provided with spring actuating means 255$^b$ in supporting arm 255$^a$, tending to move the arm toward the gear 253, and the lever 257 has a projection 257$^a$ which, in one of the positions of said lever, lies in the path of movement of the pin to engage the rearward end thereof and remove it from engagement with one of the holes 256 in said gear 253. In normal operation assume the pin to be in engagement with the gear 253. As the arm carrying the pin approaches the projection 257$^a$, the latter engages pin and removes it against tension of spring 255$^b$ to stop shaft 185 with guides in position shown in Figure 3. When in due course the lever 257 is raised the pin is released and again engages one of the holes in the continuously rotating gear 253 thereby rotating shaft 185 at least one revolution in time to remove guides 165 as one container on the conveyor moves out of position.

After a container 169 with its contents passes the separating device, the conveyor 191 deposits the container upon an endless conveyor 191$^a$, (see Figs. 1 and 2,) this conveyor lying in a plane which will help the containers tilted to prevent displacement of the contents as the containers are delivered from the machine.

The conveyor 191$^a$ includes the sprockets 259 and 260 and idler 259$^a$, over which the endless chain 261 is trained, the upper stretch of the chain operating in an inclined track 262 from which an inclined wall 263 formed of rollers 264 extends for guiding a group of the containers as they are delivered from the machine. The conveyor chain 261 is continuously driven by the provision of a shaft 265 on which the sprocket 259 is mounted, bevel gearing 266 connecting said shaft 265 to the shaft 203.

Having thus described my invention and illustrated its use, what I claim as new and desire to secure by Letters Patent is:

1. In an apparatus of the character described, in combination, means for grasping an article at a plurality of spaced points, means for propelling and for scoring such article, and means for continuously advancing the sections thus formed in a plurality of different parallel planes which are both laterally and perpendicularly displaced for breaking said sections apart.

2. In a device of the character described, in combination, supporting means, a plurality of endless belts in spaced relation carried by such supporting means, and a plurality of circular knives arranged in spaced relationship alternately with respect to said endless belts, said belts being trained over and in contact with portions of said circular knives and so arranged as to be in contact with and propel a material while the latter is scored by said knives.

3. In a device of the character described, in combination, supporting means, a plurality of endless belts in spaced relation carried by such supporting means, a plurality of circular knives arranged in spaced relationship alternately with respect to said endless belts, a plurality of circular discs arranged between and affixed to said knives, and said belts being trained over and in contact with said circular discs and with the material before and during its passage between said knives.

4. In combination, a magazine, adapted to contain a plurality of articles, means for ejecting such articles from such container, means for scoring said articles arranged adjacent to said ejecting means, means for receiving such articles seriatim in stacks, means for moving said receiving means synchronously with said ejecting means, and means for accelerating the rate of movement of said receiving means at predetermined intervals.

5. In combination, a magazine, adapted to contain a plurality of articles, means for ejecting such articles from such container, means for scoring said articles arranged adjacent to said ejecting means, means for receiving such articles seriatim in stacks, means for moving said receiving means synchronously with said ejecting means, and means for accelerating the rate of movement of said receiving means at predetermined intervals, said moving means cooperating to stop said ejecting means upon such accelerated movement of the receiving means.

6. The method of producing and stacking strips of material which includes a substantially continuous successive steps thereof advancing a sheet of such material of a width equal to the length of the strips to be formed, transversely cutting such sheet into a group of strips, and advancing said group of strips in separated paths as one to form a plurality of stacks.

7. In a device of the character described, in combination, a magazine adapted to hold a plurality of articles, means for ejecting the contents of said magazine seriatim, means receiving said articles directly from said magazine and for scoring such articles transversely, means in communication with said scoring means for causing the sections of the articles thus scored to move in different planes for separating the sections, and means receiving the sections from said separating means for stacking such sections.

8. In a device of the character described, in combination, a magazine adapted to hold a plurality of articles, means operating on said magazine for ejecting the contents of said magazine seriatim, means receiving such articles from the magazine and for scoring such articles transversely, means for causing the sections of the articles as they leave said scoring means to move in different planes for separating the sections, means for receiving and stacking such sections, and means for propelling said stacking means at a predetermined rate of speed synchronously with said ejecting means.

9. In a device of the character described, in combination, a magazine adapted to hold a plurality of articles, means for ejecting the contents of said magazine seriatim, means cooperating directly with said ejecting means for receiving and scoring such articles, means adjacent to the last mentioned means for receiving and causing the articles thus scored to move in different planes for separating same into sections, and stacking means for the articles operating concurrently with said ejecting and scoring means to receive and stack the separated sections.

10. In combination, a container for containing a plurality of sheets, means on said container for feeding such sheets seriatim, means cooperating with said feeding means for dividing such sheets into a plurality of sections, means operating synchronously with said feeding and scoring means for receiving such sheets in stacks, and means for synchronously propelling said receiving means, and means for imparting an accelerated movement to said receiving means at predetermined intervals.

11. In an apparatus of the character described, means for advancing a sheet of material of a width corresponding to the length of a strip to be produced, means located in the path of advancement of said sheet for dividing said sheet into such strips, a receptacle for receiving such strips in a stack synchronously from said dividing means, and means for moving said receptacle so that the top level of the stack remains substantially constant as to position with respect to said dividing means.

12. In combination, a magazine adapted to contain a plurality of articles, means for ejecting the articles from said container, means for scoring and separating said articles into sections and arranged in an inclined plane adjacent to said magazine, means receiving the articles below said scoring means in substantially the same inclined plane for conducting the articles with the aid of gravity, and means for stacking the articles adjacent to said conducting means arranged to move synchronously in a plane angularly related to the plane of said conducting and separating means.

13. In combination, a magazine adapted to contain a plurality of articles, means for ejecting the articles from said container, means for scoring and separating said articles into sections and arranged in an inclined plane adjacent to said magazine, means receiving the articles below said scoring means in substantially the same inclined plane for conducting the articles with the aid of gravity, means for stacking the articles including a synchronously moving conveyor in a plane angularly related to the plane of said separating means, and means for causing acceleration of said conveyor at predetermined intervals.

14. In combination, a magazine adapted to contain a plurality of articles, means for ejecting the articles from said container, means for scoring and separating said articles into sections and arranged in an inclined plane adjacent to said magazine, means receiving the articles below said scoring means in substantially the same inclined plane for conducting the articles with the aid of gravity, means for stacking the articles including a synchronously moving conveyor in a plane angularly related to the plane of said separating means, a series of separate containers on said conveyor, and means for automatically causing variation in the speed of said conveyor at intervals corresponding substantially to the transition from one container to a following container.

15. In combination, a magazine adapted to contain a plurality of articles, means for ejecting the articles from said container, means for scoring and separating said articles into sections and arranged in an inclined plane adjacent to said magazine, means receiving the articles below said scoring means in substantially the same inclined plane for conducting the articles with the aid of gravity, means for stacking the articles including a synchronously moving conveyor in a plane angularly related to the plane of said separating means, a series of separate containers on said conveyor, and means for automatically causing variation in the speed of said conveyor and temporary stoppage of said ejecting means at intervals corresponding substantially to the transition from one container to a following container.

16. In an apparatus of the character described, in combination, means for sustaining a plurality of articles in a stack, means for ejecting such articles seriatim from the stack, means cooperating with said ejecting means for scoring such articles into sections as they are delivered, means for separating the sections and for conducting them as one, and means for receiving simultaneously the separated sections from said separating means and for conducting them to be stacked in parallel piles.

17. In a separating device of the character described, in combination, a plurality of complemental series of spaced cutting elements, a plurality of parallel sheet feeding elements passing between adjacent cutting elements, and means for adjusting said cutting elements perpendicularly to the plane of movement of material through the device and thus placing said feeding elements under tension.

18. In a separating device of the character described, in combination, a plurality of complemental series of spaced cutting elements, a plurality of parallel sheet feeding elements passing between adjacent cutting elements, said cutting elements being arranged to score the material into sections, and means for displacing said feeding elements alternately perpendicularly to the plane of movement of the material for separating the sections along the scoring.

19. In a device of the character described, in combination, a pair of series of multiple spaced revoluble knives having their cutting edges complementally disposed in spaced relationship less than the thickness of a material to be passed therebetween for scoring the same, means for feeding the material between said knives including a pair of series of multiple spaced belts, and means for alternately offsetting said belts perpendicularly to the plane of movement of the material for breaking the material along the scoring.

20. In a separating device of the character described, in combination, a plurality of complemental series of spaced cutting elements, a plurality of parallel sheet feeding elements passing between adjacent cutting elements, a pair of trimming knives at opposite edges of the sheet adjacent to said cutting elements, and means for adjusting said cutting elements perpendicularly to the plane of movement of material through the device and thus placing said feeding elements under tension.

21. In a device of the character described, in combination, a pair of series of multiple spaced revoluble knives having their cutting edges complementally disposed in spaced relationship less than the thickness of a material to be passed therebetween for scoring the same, means for feeding the material between said knives including a pair of series of multiple spaced belts, stationary trimming knives adjacent to said revoluble knives, and means for alternately offsetting said belts perpendicularly to the plane of movement of the material for breaking the material along the scoring.

22. In a scoring and breaking apparatus, in combination, a pair of multiple circular knives having the opposed edges thereof in spaced relationship, said multiple knives being in spaced relation, and superposed propelling members extending through the spaces between said knives in contact with and for feeding a material as it passes between said knives and said propelling members.

23. In a device of the character described, in combination, means for scoring an article, means for propelling such article, and said propelling means having portions thereof displaced alternately to different planes perpendicular to the movement of the article for separating the sections of such article formed by the scoring means.

In testimony whereof I have hereunto signed my name.

BENJAMIN S. PENLEY.